United States Patent [19]

Waterman

[11] Patent Number: 4,823,494
[45] Date of Patent: Apr. 25, 1989

[54] COMBINATION TIP-UP AND HOLE COVER

[76] Inventor: Phillip S. Waterman, 241 South St., Amery, Wis. 54001

[21] Appl. No.: 134,315

[22] Filed: Dec. 17, 1987

[51] Int. Cl.⁴ .............................................. A01K 97/12
[52] U.S. Cl. ............................................. 43/17; 43/16
[58] Field of Search ..................................... 43/16, 17

[56] References Cited

U.S. PATENT DOCUMENTS

| 2,654,176 | 10/1953 | Kachelski et al. | 43/17 |
| 2,786,294 | 3/1957 | Whitacre | 43/17 |
| 3,578,748 | 5/1971 | Hurd | 43/17 |
| 4,285,154 | 8/1981 | Grahl | 43/17 |
| 4,685,240 | 8/1987 | Fralick | 43/16 |

Primary Examiner—M. Jordan
Attorney, Agent, or Firm—James R. Cwayna

[57] ABSTRACT

The combination of a tip-up and cover for a hole drilled through the ice for ice fishing which substantially insulates the hole to prevent ice accumulation and which, upon a fish striking the bait, provides a connective, releasable attachment to an alerting device such as a flag or other indicator. The unit consists of a hole cover of an insulating material of a size and configuration to be placed over a hole drilled through the ice with a signal or alerting device arranged on the upper surface thereof. The alerting device is removably attached to the cover and includes an actuating rod extending below the surface of the water to a line reel or spool which, upon rotation of the reel, due to a fish striking the bait, causes rotation of the rod and subsequent release of the alerting element. This signaling or alerting device includes a spring loaded flag which is captured and set when the bait is placed into the water and upon rotation of the reel releases the flag to signal that a fish is on the line.

1 Claim, 1 Drawing Sheet

U.S. Patent
Apr. 25, 1989
4,823,494
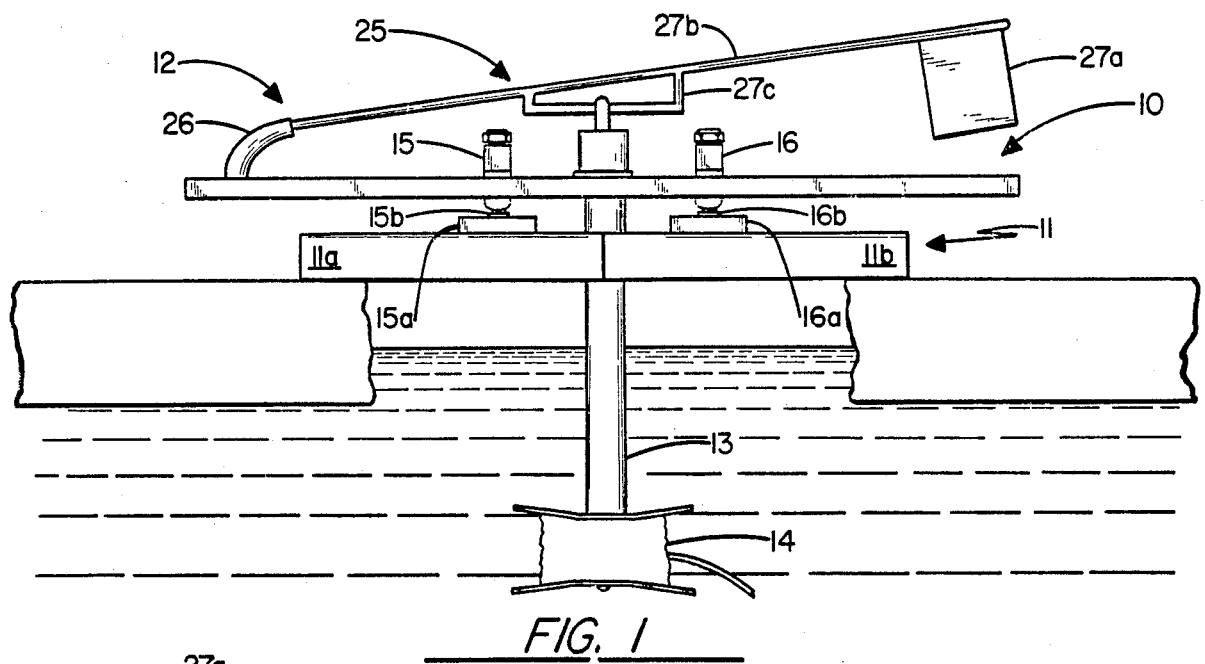
FIG. 1
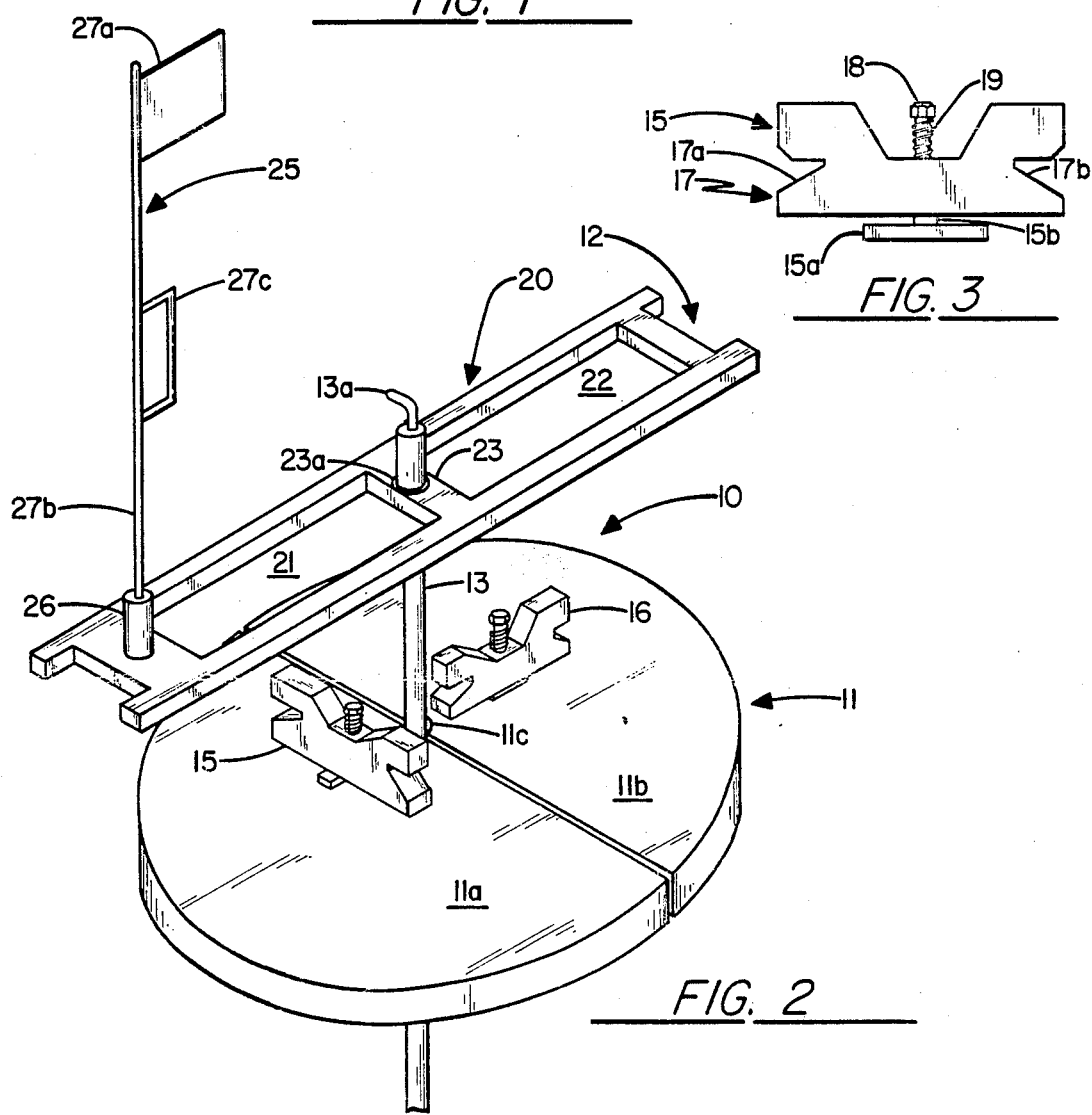
FIG. 3
FIG. 2

COMBINATION TIP-UP AND HOLE COVER

FIELD OF THE INVENTION

This invention relates generally to ice fishing equipment and more specifically to the combination of a tip-up and hole cover which cover prevents the accumulation of ice with the tip-up being arranged to extend through the cover with the reel of the unit being arranged below the surface of the water and the alerting or signaling device arranged above the insulating cover.

SHORT SUMMARY OF THE INVENTION

This invention relates generally to ice fishing equipment and more particularly to a unit which is insertable into and which covers a hole drilled through the ice and includes an actuated mechanism for alerting or signaling that the bait has been taken and the fish may be caught. The hole covering portion of the unit is designed to permit placement of the unit into and over a hole drilled through the ice and allow and position an actuating rod generally centrally thereof with means for holding the entire alerting and signaling device in position above the ice. The alerting device includes a spring loaded flag or other signaling device actuated upon rotation of the rod due to a fish having taken the bait. The signaling or actuating or alerting device is actuated upon rotation of the rod into and from a capturing mechanism initially set by the user. The line containing reel is connected to the rod and is positioned below the surface of the water.

BACKGROUND AND OBJECTS OF THE INVENTION

Ice fishermen are well aware of the fact that a hole cut through the ice will ultimately accumulate ice particles on the surface of the water which requires constant removal and to maintain the tip-up in operative condition.

With the applicant's device as disclosed herein the hole is maintained in insulated condition to prevent the accumulation of ice and eliminate this maintenance situation with the alerting or signaling portion of the tip-up arranged above water surface and the line containing reel being arranged below the water surface.

The applicant has searched the commercially available art and has also searched the applicable prior art and references.

Applicant has not found commercially acceptable or useable units which incorporate the concepts of his invention. The prior patented art includes patents to C. H. Peterson, U.S. Pat. No. 3,134,188; Hurd, U.S. Pat. No. 3,578,748; Williams, U.S. Pat. No. 3,745,689; Nomsen, U.S. Pat. No. 3,230,655; and Wiltse, U.S. Pat. No. 3,698,117. These prior art references do teach that the concept of insulating holes drilled through the ice with the reel or line containing spool being arranged below the water surface, the alerting device being arranged above the water surface and a covering or what may be termed an insulating unit on the ice surface.

None of these patents, however, illustrate nor describe the aspects of the applicant's invention nor do they include the advantages of his invention. The Peterson Patent is simply a covering pad with a central aperture and slit for passing the line. The Hurd Patent is simply a buoyant cover to be placed into a hole in the ice with the patentability thereof apparently based upon a black coating on its upper surface to absorb heat and maintain a central aperture in ice free condition. The Williams Patent discloses a complete mechanical box unit mountable on the ice with the line containing reel and all operative portions of the unit mounted above the water surface. The Nomsen Patent includes mechanisms above and below the water surface actuated by reel rotation but is basically directed to a housing of a particular configuration into which a particularly designed tip-up must be positioned. The Wiltse Patent again provides a specifically shaped housing unit with the actuating portions of the tip-up being mounted within the housing and above the water surface.

With the applicant's device as disclosed herein it is obvious that the general objects of the invention are distinctly unique from the references found in the conducted search. Applicant's device provides a unit which is adaptable to holes of various sizes and which is specifically designed to provide immediate actuation of the alerting and signaling device in response to rotation of the line containing reel or spool upon the fish taking the bait. Applicant's device further provides a unit which is easily assembled and disassembled for insertion and placement into holes drilled through the ice while eliminating and preventing accumulation of ice or slush on the water's surface which will normally inhibit actuation of the unit.

It is therefore an object of the applicant's invention to provide a combination tip-up and hole cover for use in ice fishing which provides an insulating cover for the hole to prevent accumulation of ice with means for mounting the reel below the surface of the water and means for mounting and alerting device above the surface of the cover.

These and other objects of the invention will more fully appear from a consideration of the accompanying disclosure and drawings.

SHORT DESCRIPTION OF THE DRAWINGS

FIG. 1 is a side elevation of the combination tip-up and hole cover embodying the concepts of the applicant's invention and illustrating the same as it would be in use;

FIG. 2 is a perspective view of applicant's invention and illustrating the same in exploded form; and, FIG. 3 is a side elevation of a portion of the unit which incorporates means for connecting the hole covering portion with the alerting or signaling portion of the unit.

DESCRIPTION OF A PREFERRED FORM OF THE INVENTION

As illustrated in the accompanying drawings the applicant's combination tip-up and hole cover for ice fishing is generally designated 10. The combination consists of a hole cover portion 11 and an alerting, signalling portion 12. For clarity of the individual portions 11-12, the unit 10 is illustrated in exploded form in FIG. 2. FIG. 1 illustrates the entire unit 10 as utilized in position in a hole drilled through the ice.

As particularly illustrated, cover section 11 consists of a split bodied unit of substantially identical halves 11a-11b providing a top portion consisting of a unit of predetermined radial dimension such that it will overlie and cover a hole cut into the ice. As illustrated the sections 11a-11b are provided with a central passage 11c to permit an actuating rod 13 to pass therethrough and connect the alerting, signalling portion 12 to a line containing spool or reel 14.

In the form shown, two capturing elements 15–16 are provided on the respective sides of a cover plate 11a–11b and are spring loaded and rotatably mounted on plates 11a–11b to receive and capture the alerting unit 12 therein.

One of these attachment elements 15 is illustrated in FIG. 3. Both attachment elements 15–16 are identical and the description of one is applicable to the other. As illustrated in FIG. 3 a first base unit 15a is provided for placement onto and attachment to plate 11a with a bearing member 15b thereon which bearing member permits rotation and placement of a capturing portion 17 to receive and hold alerting unit 12. Fastening means 18 having a head and spring 19 for loading of the attachment element 15 are provided to communicate with and connect element 15 to the respective base cover plate 11a. In the form shown the attachment element 15 includes a generally rectangular member having a pair of opposed side receiving areas 17a–17b to receive and hold the alerting unit 12. The alerting device includes a spring loaded flag or other signalling device actuated upon rotation of rod 13 due to a fish being caught or having taken the bait and rotating spool 14. The signalling or alerting device actuation is initiated upon rotation of the rod 13 into a catch mechanism as controlled and initially set by the user.

The alerting unit 12 in the form shown includes a longitudinally extending generally rectangular member 20 having a pair of apertures 21–22 spaced from a central rod receiving cross member 23. As illustrated rod 13 extends through the aforementioned insulating members 11a–11d and upwardly through cross bar 23 of the alerting device 12. A washer member or the like 23a may be provided to insure rotation of the rod 13 with respect to the alerting device 12. A capturing hook 13a is provided on the uppermost end of rod 13 to releasably engage a selected portion of an alerting flag 25. As illustrated, this flag unit includes a spring mounting end 26 secured to one end of the alerting body unit 20 and a flag 27a and a flagstaff 27b are secured to the spring for movement from a generally horizontal or non-alerting position as illustrated in FIG. 1 to the alerting, fish catching position, of FIG. 2. Intermediate the spring end 26 and flag 27a a capturing frame work 27c is provided. This frame work 27c basically includes an outwardly extending, generally U-shaped element which will engage with the hook 13a of rod 13 when in the non-signalling or non-alerting position of FIG. 1.

The two apertures 21–22 are provided to permit placement of the alerting device 12 into position with the attachment elements 15–16 and particularly into the side receiving areas 17a–17b of each of the attachment elements 15–16. As illustrated in FIG. 2 the attachment elements 15–16 are rotatable such that they will be received into the passages 21–22 and thereafter rotated such that the sides bounding such passages 21–22 will be received into such receiving areas 17a–17b. The combination of the spring arrangement 18–19 permits lifting and ease of adjustment of these attachment members 15–16 and ease of placing the same to properly hold the alerting and signalling device 12 in proper relation to the indulating cover unit 11a–11b.

Although a particular form has been illustrated for attachment of the alerting section 12 to the insulation top section 11a–11b, it should be obvious that other structures will permit this connectable arrangement.

The use of the combination tip-up and hole cover should be obvious. The split design arrangement allows for easy placement and removal of the unit from the ice and the capturing technique for setting the alerting device simply requires rotation of the rod 13 into placement within the framework 27c of the flag shaft 25. When a fish takes the bait and causes the reel 14 to spin the hook 13a is disengaged from the framework 27c and the flag will spring into alerting position and the fisherman simply has to remove the cover from the hole and pull the line as is typical by hand.

What is claimed is:

1. A combination tip-up and hole cover for ice fishing, including:
   a. an insulating member for placement over a hole formed through the ice;
   b. an aperture formed through said insulating member;
   c. an actuation rod having a line containing reel on end thereof, said reel being arranged below the surface of the water and said latching element being arranged above said insulating member, said actuation rod passing through said aperture of said insulating member;
   d. an alterting and signaling device positionable on said insulating member having a portion thereof engageable with said latching element for release and signaling upon rotation of said reel;
   e. said altering and signalling device including a longitudinally extending base;
   f. mounting means on said insulating member to receive and position said base relative to said aperture and said actuation rod;
   g. said mounting means including a pair of rotatable attachment means spaced on said insulating member; and,
   h. said alerting and signalling device including a pair of attachment receiving apertures therethrough to receive said mounting means for attachment to said insulating member.

* * * * *